US008629209B2

(12) United States Patent
Lee et al.

(10) Patent No.: US 8,629,209 B2
(45) Date of Patent: Jan. 14, 2014

(54) MOISTURE CURABLE ISOBUTYLENE ADHESIVE COPOLYMERS

(75) Inventors: Hae-Seung Lee, Woodbury, MN (US); Joon Chatterjee, Bloomington, MN (US); Babu N. Gaddam, Woodbury, MN (US); Gregg A. Caldwell, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 250 days.

(21) Appl. No.: 13/287,148

(22) Filed: Nov. 2, 2011

(65) Prior Publication Data

US 2012/0141787 A1 Jun. 7, 2012

Related U.S. Application Data

(60) Provisional application No. 61/419,017, filed on Dec. 2, 2010.

(51) Int. Cl.
 *C09B 67/00* (2006.01)
 *B32B 7/12* (2006.01)

(52) U.S. Cl.
 USPC .................................. 524/502; 428/355 EN

(58) Field of Classification Search
 USPC ....................................................... 524/502
 See application file for complete search history.

(56) References Cited

U.S. PATENT DOCUMENTS

| | | | |
|---|---|---|---|
| 2,803,615 A | 8/1957 | Ahlbrecht et al. | |
| 3,842,059 A | 10/1974 | Milkovich et al. | |
| 4,181,752 A | 1/1980 | Martens et al. | |
| 4,329,384 A | 5/1982 | Vesley et al. | |
| 4,378,250 A | 3/1983 | Treadway et al. | |
| 4,533,723 A | 8/1985 | Weitemeyer | |
| 4,619,979 A | 10/1986 | Kotnour et al. | |
| 4,732,808 A | 3/1988 | Krampe et al. | |
| 4,843,134 A | 6/1989 | Kotnour et al. | |
| 5,204,219 A | 4/1993 | Van Ooij et al. | |
| 5,459,174 A | 10/1995 | Merrill et al. | |
| 5,464,900 A | 11/1995 | Stofko, Jr. et al. | |
| 5,468,353 A | 11/1995 | Anich et al. | |
| 5,567,775 A | 10/1996 | Wang et al. | |
| 5,602,221 A | 2/1997 | Bennett et al. | |
| 5,639,546 A | 6/1997 | Bikadi | |
| 5,650,261 A | 7/1997 | Winkle | |
| 5,852,148 A | 12/1998 | Behr et al. | |
| 6,063,838 A | 5/2000 | Patnode et al. | |
| 6,380,149 B2 | 4/2002 | Flynn et al. | |
| 6,630,238 B2 | 10/2003 | Hyde et al. | |
| 6,632,522 B1 | 10/2003 | Hyde et al. | |
| 6,664,354 B2 | 12/2003 | Savu et al. | |
| 6,861,139 B2 | 3/2005 | Takeda | |
| 2003/0091816 A1 | 5/2003 | Takeda | |
| 2009/0281002 A1 | 11/2009 | Casper | |
| 2009/0291238 A1* | 11/2009 | Scott et al. ...................... 428/34 |
| 2011/0073901 A1 | 3/2011 | Fujita | |
| 2011/0105637 A1 | 5/2011 | Fujita | |
| 2011/0282010 A1 | 11/2011 | Fujita | |

FOREIGN PATENT DOCUMENTS

| | | |
|---|---|---|
| EP | 0 252 372 | 1/1988 |
| EP | 0 448 902 | 10/1991 |
| EP | 0 372 756 | 12/1993 |
| EP | 1 057 861 | 12/2000 |
| EP | 1 757 629 | 2/2007 |
| GB | 1276673 | 6/1972 |
| JP | 10176156 | 6/1998 |
| WO | WO 92/11295 | 7/1992 |
| WO | WO 2006/093702 | 9/2006 |
| WO | WO 2007/087281 | 8/2007 |
| WO | WO 2009/148722 | 12/2009 |
| WO | WO 2010/141248 | 12/2010 |
| WO | WO 2011/017298 | 2/2011 |
| WO | WO 2011/062851 | 5/2011 |
| WO | WO 2011/062852 | 5/2011 |

OTHER PUBLICATIONS

PCT International Search Report, PCT/US2011/060683, dated Jan. 31, 2012.
U.S. Appl. No. 13/280,519, entitled "UV Curable Anhydride-modified Poly(isobutylene)," filed Oct. 25, 2011.
U.S. Appl. No. 13/169,573, entitled "Radiation Curable Poly(isobutylene) Adhesive Copolymers," filed Jun. 27, 2011.
U.S. Appl. No. 13/282,500, entitled "Ionically Crosslinkable Poly(isobutylene) Adhesive Polymers," filed Oct. 27, 2011.
U.S. Appl. No. 13/285,513, entitled "Isobutylene (Co)polymeric Adhesive Composition," filed Oct. 27, 2011.
U.S. Appl. No. 13/027,484, entitled "Isobutylene Copolymer with Grafted Polymer Groups," filed Feb. 15, 2011.
U.S. Appl. No. 61/432,388, entitled "Methods for Treating Siliciclastic Hydrocarbon-bearing Formations with Fluorinated Amine Oxides," filed Jan. 13, 2011.
U.S. Appl. No. 61/424,990, entitled "Method for Treating Carbonate Hydorcarbon-bearing Formations with Fluoorinated Amine Oxides," filed Dec. 21, 2010.
U.S. Appl. No. 61/262,613, entitled "Pressure Sensitive Adhesive Comprising Functionalized Polyisobutylene Hydrogen Bonded to Acylic Polymer," filed Nov. 19, 2009.

(Continued)

*Primary Examiner* — Hui Chin
(74) *Attorney, Agent, or Firm* — Kent S. Kokko

(57) ABSTRACT

The disclose provides pressure-sensitive adhesives and adhesive sealants prepared from alkoxysilane modified, crosslinked isobutylene copolymers, and tape articles prepared therefrom.

21 Claims, No Drawings

(56) References Cited

OTHER PUBLICATIONS

U.S. Appl. No. 61/262,611, entitled "Pressure Sensitive Adhesive Comprising Blend of Synthetic Rubber and Functionalized Synthetic Rubber bonded to an Acylic Polymer," filed Nov. 19, 2009.

Abbate, et al., "Maleated Polyisobutylene: A Novel Toughener for Unsaturated Polyester Resins," Journal of Applied Polymer Science, vol. 58, Issue 10, pp. 1825-1837, (1995).

Shirai, et al., "Photoacid and photobase generators: Chemistry and applications to polymeric materials," Progress in Polymer Science, vol. 21, pp. 1-45, (1996).

Tachi, et al., "Photochemical Reactions of Quaternary Ammonium Dithiocarbamates as Photobase Generators and Their Use in The Photoinitiated Thermal Crosslinking of Poly(gycidylmethacrylate)," Journal of Polymer Science, Part A: Polymer Chemistry, vol. 39, Issue 9, pp. 1329-1341, (2001).

Ranganathan, et al., "Peroxide-Initiated Grafting of Maleic Anhydride onto Linear and Branched Hydrocarbons," Journal of Polymer Science: Part A: Polymer Chemistry, vol. 37, Issue 20, pp. 3817-3825, (1999).

Heinen, et al., "C NMR Study of the Grafting of Maleic Anhydride onto Polyethene, Polypropene, and Ethene-Propene Copolymers," Macromolecules, vol. 29, Issue 4, pp. 1151-1157, (1996).

Shi, et al., "Functionalization of isotactic polypropylene with maleic anhydride by reactive extrusion: mechanism of melt grafting," Polymer, vol. 42, Issue 13, pp. 5549-5557, (2001).

Cameron, et al., "Photogeneration of Organic Bases from o-Nitrobenzyl-Derived Carbamates," Journal of the American Chemical Society, vol. 113, Issue 11, pp. 4303-4313, (1991).

Frechet, et al., "Photogenerated Amines and Diamines: Novel Curing Systems for Thin Film Coatings," J. Polym. Mater. Sci. Eng., vol. 64, pp. 55-56 (1991).

Cameron, et al., "Base catalysis in Imaging Materials. 1. Design and Synthesis of Novel Light-Sensitive Urethanes as Photoprecursors of Amines," The Journal of Organic Chemistry, vol. 55, Issue 23, pp. 5919-5922, (1990).

Chung, et al., "Butyl rubber graft copolymers: synthesis and characterization," Polymer, vol. 36, No. 18, pp. 3565-3574, 1995.

\* cited by examiner

MOISTURE CURABLE ISOBUTYLENE ADHESIVE COPOLYMERS

CROSS REFERENCE TO RELATED APPLICATION

This application claims the benefit of U.S. Provisional Patent Application No. 61/419,017, filed Dec. 2, 2010, the disclosure of which is incorporated by reference herein in its entirety.

TECHNICAL FIELD

This invention relates to pressure-sensitive adhesives and adhesive sealants prepared from isobutylene copolymers, and tape articles prepared therefrom. The pressure-sensitive adhesives are characterized by exhibiting an overall balance of adhesive and cohesive characteristics and exceptional adhesion to low surface-energy substrates.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are a wide variety of pressure sensitive adhesive (PSA) materials available today that include natural crude or synthetic rubbers, block copolymers, and acrylic ester based polymeric compositions. Central to all PSAs is a desired balance of adhesion and cohesion that is often achieved by optimizing the physical properties of the acrylic elastomer, such as glass transition temperature and modulus. For example, if the glass transition temperature ($T_g$) or modulus of the elastomer is too high and above the Dahlquist criterion for tack (storage modulus of $3\times10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

SUMMARY

The adhesive (co)polymers of this disclosure comprise: a) an isobutylene copolymer having pendent alkoxysilane groups, b) a tackifier, and c) optionally a non-functionalized poly(isobutylene) polymer. In one aspect the pressure-sensitive adhesive comprises the interpolymerized reaction product of isobutylene and at least one monomer having a pendent alkoxysilane group.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3\times10^6$ dynes/cm at a frequency of 1 Hz.

In some embodiments, hot melt adhesive compositions are provided which applied to substrates from the melt. Such hot melt adhesive compositions are substantially solvent-free. Hot melt adhesives are versatile and widely used in industrial applications, such as bookbindings, cardboard boxes, plastic parts and wooden articles, among others. They are generally 100% solid adhesives with application temperatures which vary from about 150 to about 180° C., In recent years, there has been a significant increase of the usage of low surface energy, olefin-based thermoplastics (e.g., polyethylene, polypropylene, ethylene propylene diene monomer rubber (EPDM)) in automotives, paints, appliances and electronics markets. The advantages of the new materials include affordable cost, easy processibility, and excellent mechanical properties. However, this trend creates a challenge in terms of making adhesive bonds to these low energy surfaces.

When considering adhesive tapes, pressure-sensitive adhesive (PSA) tapes are the easiest to use, but for the most part, pressure-sensitive adhesives do not adhere well to low surface energy substrates. Additionally, most PSAs are unsuited for uses requiring good internal (cohesive) strength at elevated temperatures. For example, rubber-resin PSAs tend to soften and degrade when heated. PSAs based on styrene-containing block copolymers also do not retain good internal strength when heated, because styrene has a low $T_g$ and so softens at moderately elevated temperatures. Currently the bonding to low surface-energy surfaces is achieved by priming the substrate with polar liquid followed by application of PSAs. Even after this two step process, the existing PSAs do not fulfill customer requirements. There is need to develop primerless LSE PSAs at competitive cost but still with the most optimized properties.

Recently, polyisobutylene (PIB) has been considered as an attractive material for low surface energy (LSE) bonding applications due to its excellent adhering properties on olefin-based thermoplastics. In addition, the excellent moisture and oxygen barrier properties of PIB suggest that PIB-based materials have potential use in electronic and photovoltaic encapsulation applications. In spite of its beneficial properties, low cohesive strength of the material has limited the uses for high shear applications. Another possible application for PIB-based material is in the medical adhesive field. Most acrylate-based PSAs are not suitable for medical application since acrylate PSAs tend to give off toxic vapors at elevated temperatures. Acrylate-based PSAs typically contain monomeric materials which, even at ordinary room temperatures, exude odors that make acrylate PSA tapes generally unsuitable for medical uses. Polyisobutylene PSAs are often used for medical uses because they are physiologically inert, but again they tend to be deficient in internal strength.

The adhesive compositions of the present disclosure provide an improved pressure-sensitive and hot-melt adhesive composition which may be adhered to a variety of substrates, including low surface-energy (LSE) substrates, within a wide temperature range and provide good adhesive strength and holding characteristics. The adhesive compositions are easily handled, and are environmentally friendly due to the low volatile organic compound (VOC) content, such as solvents. The adhesive compositions of the present disclosure further provide a pressure-sensitive adhesive article, such as adhesive tapes and sealants.

As used herein

"Alkyl" means a linear or branched, cyclic or acrylic, saturated monovalent hydrocarbon having from one to about twelve carbon atoms, e.g., methyl, ethyl, 1-propyl, 2-propyl, pentyl, and the like.

"Alkylene" means a linear unsaturated divalent hydrocarbon having from one to about twelve carbon atoms or a branched saturated divalent hydrocarbon having from three to about twelve carbon atoms, e.g., methylene, ethylene, propylene, 2-methylpropylene, pentylene, hexylene, and the like.

"Alkenyl" means a linear saturated monovalent hydrocarbon having from one to about twelve carbon atoms or a branched unsaturated hydrocarbon having from three to about twelve carbon atoms.

"Aryl" means a monovalent aromatic, such as phenyl, naphthyl and the like.

"Arylene" means a polyvalent, aromatic, such as phenylene, naphthalene, and the like.

"Aralkylene" means a group defined above with an aryl group attached to the alkylene, e.g., benzyl, 1-naphthylethyl, and the like.

As used herein, "(hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

DETAILED DESCRIPTION

The adhesive copolymer comprises: a) an isobutylene copolymer having pendent alkoxysilane groups, b) a tackifier, and c) optionally a non-functionalized poly(isobutylene) polymer. In one aspect the pressure-sensitive adhesive comprises the interpolymerized reaction product of isobutylene and at least one monomer having pendent alkoxysilane groups.

The isobutylene copolymer having pendent alkoxysilane groups may be represented by the general formula:

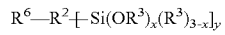

where $R^6$ represents the polymeric isobutylene having at least 20 repeat units, $R^2$ is a (hetero)hydrocarbyl group, subscript y represents a fraction of those repeat units substituted by the alkoxysilane group, and each $R^3$ is an alkyl group or aryl group. Typically 1 to 5 percent of the repeat units of the isobutylene copolymer will be substituted by alkoxysilane groups. Preferably $R^2$ is a saturated alkylene of 1 to ten carbon atoms, optional containing one or more.

The monomer units having pendent, moisture curable alkoxysilane groups may be derived from halogenated butyl rubber and are of the general formula:

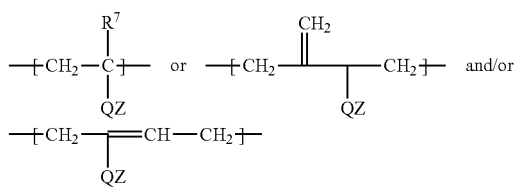

wherein Q is a multivalent, preferably divalent, linking group, Z is alkoxysilane group and $R^7$ is H or $CH_3$. More particularly, the isobutylene copolymer may be of the formula;

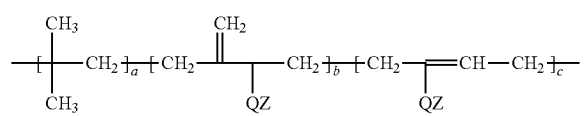

wherein a is at least 20, and at least one of b and c are at least one, Q is a polyvalent linking group and Z is a alkoxysilane group; or

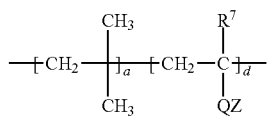

wherein a and d are at least 1, preferably a is at least 20, d is at least one, $R^7$ is H or $CH_3$, Q is a polyvalent linking group and Z is alkoxysilane group.

With respect to the copolymers of Formulas I and II it will be recognized that the monomer units having the subscript "a" are interpolymerized isobutylene monomer units. The -Q-Z moiety may be of the formula:

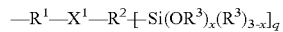

where
$R^1$ is a multivalent alkylene or arylene group, $X^1$ is —O—, —O$_2$C—, —NR$^4$—, where $R^4$ is H or $C_1$-$C_4$ alkyl; $R^2$ is a (hetero)hydrocarbyl group, preferably a saturated alkylene, $R^3$ is an alkyl group or aryl group, x is 1 to 3, preferably 3, and q is 1 or 2.

Further, with regard to Formulas I and II, the subscripts "b" and "c" or "d" are chosen such that the copolymer comprises 1 to 20 wt. % of the respective monomer units: e.g. b and c are such that the -Q-Z containing monomer units comprise 1 to 20 wt. % of the copolymer.

The copolymers of isobutylene may include those wherein isobutylene is copolymerized with another monomer, which may be subsequently modified to include the pendent unsaturated group. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). In some embodiments, the copolymers are substantially homopolymers of isobutylene, for example, polyisobutylene resins, which may be subsequently modified to include the pendent unsaturated group, available under the tradenames OPPANOL (BASF AG) and GLISSOPAL (BASF AG). The copolymers also include copolymers of mostly isobutylene with n-butene or butadiene, which may be subsequently modified to include the pendent unsaturated group. In some embodiments, a mixture of copolymers may be used, i.e., the first polyisobutylene comprises a homopolymer of isobutylene and the second polyisobutylene comprises butyl rubber, or the first polyisobutylene comprises butyl rubber and the second polyisobutylene comprises a copolymer of isobutylene, subsequently modified. Blends of isobutylene homopolymer and modified poly(isobutylene) are also contemplated.

The isobutylene copolymer may comprise a random copolymer of isobutylene and modified paramethylstyrene units, wherein said random copolymer contains 1 to 20% by weight of said modified paramethylstyrene units and has a crosslinked structure. This random copolymer is, for example, commercially available from Exxon Chemical Co. under the trade name of EXXPRO series, and examples thereof include MDX90-10, MDX89-4. A portion of the methyl groups at the para-position of this paramethylstyrene can be brominated to form a site for the subsequent nucleophilic displacement by a compound of Formula III. Accordingly, a crosslinked structure can be formed by the technique described in detail hereinafter. Particularly, regarding the copolymer MDX90-10, 1.2% by mol of paramethylstyrene, which is contained in the copolymer in the amount of 7.5% by weight, is brominated. Regarding MDX89-4, 0.75% by mol of paramethylstyrene, which is contained in the copolymer in the amount of 5% by weight, is brominated. In addition, bromination of paramethylstyrene and random polymerization between isobutylene and paramethylstyrene, for the purpose of producing a random copolymer, can be performed by known techniques.

Paramethylstyrene monomer units can also impart heat resistance and strength to the copolymer by the cohesive force and hardness of paramethylstyrene itself. To obtain such an effect, paramethylstyrene is preferably contained in the copolymer in amounts of greater than zero, preferably about 1 to 20 parts by weight based on the total amount of the copolymer. When the amount of paramethylstyrene is smaller than 1 part by weight, the cohesive force is insufficient and it becomes difficult to obtain enough adhesion to endure practical use. On the other hand, when the amount of paramethylstyrene is larger than 20 parts by weight, the flexibility is drastically lowered and the adhesion as an important characteristics of the adhesive disappears and, therefore, it becomes impossible to refer to it as a pressure-sensitive adhesive any longer.

The copolymer of Formulas I and II are generally prepared by nucleophilic displacement of commercially available halogenated PIBs, including halogenated poly(isobutylene-co-methylstyrene), halogenated poly(isobutylene-co-isoprene). Alternatively, a non-halogenated PIB-based material may be halogenated, then subsequently substituted. The halogen moiety in those materials allows introduction of the pendent alkoxysilane groups using a nucleophilic alkoxysilane of the formula:

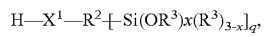

where
$X^1$ is —O—, —S—, —NR$^4$—, where $R^4$ is H or $C_1$-$C_4$ alkyl;
$R^2$ is a multivalent saturated or unsaturated alkylene or arylene, $R^3$ is an alkyl group or aryl group, x is 1 to 3, preferably 3, and q is 1 or 2.

The nucleophilic alkoxysilane compound has at least two reactive functional groups. The first reactive functional group "HX$^1$—" is capable of displacing the halogen atom of the halogenated isobutylene copolymer. For example, reactive functionalities such as amino, hydroxyl, or mercaptan can displace with complementary halide, such as chloro-, bromo-, iodo present on the isobutylene copolymer.

Additional information on nucleophilic alkoxysilane compounds may be found in U.S. Pat. No. 5,204,219, issued to Van Ooij et al., U.S. Pat. No. 5,464,900, issued to Stofko et al., and U.S. Pat. No. 5,639,546, issued to Bilkadi and European Patent Application No. 0,372,756 A2.

Useful thiosilanes include (mercaptomethyl)dimethylethoxysilane, (mercaptomethyl)methyldiethoxysilane, 3-mercaptopropylmethyldimethoxysilane, 3-mercaptopropyltriethoxysilane(mercaptomethyl)methyldiethoxysilane.

Some aminosilanes useful in the practice of this disclosure are described in U.S. Pat. No. 4,378,250 (Treadway et al., incorporated herein by reference) and include aminoethyltriethoxysilane, β-aminoethyltrimethoxysilane, β-aminoethyltriethoxysilane, β-aminoethyltributoxysilane, β-aminoethyltripropoxysilane, α-amino-ethyltrimethoxysilane, α-aminoethyltriethoxysilane, γ-aminopropyltrimethoxysilane, γ-aminopropyltrimethoxysilane, γ-aminopropyltriethoxysilane, γ-aminopropyltributoxysilane, γ-aminopropyltripropoxysilane, β-aminopropyltrimethoxysilane, β-aminopropyltriethoxysilane, β-aminopropyltripropoxysilane, β-aminopropyltributoxysilane, α-aminopropyltrimethoxysilane, α-aminopropyltriethoxysilane, α-aminopropyltributoxysilane, and α-aminopropyltripropoxysilane.

The reaction scheme involves a displacement reaction with a "nucleophilic alkoxysilane compound"; an organic compound with at least one nucleophilic functional group and least one alkoxysilane group.

Scheme 1

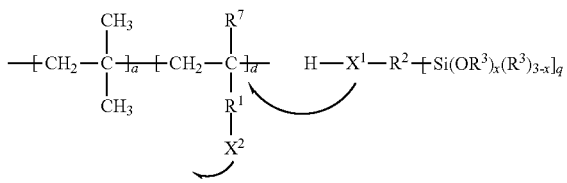

where
$R^7$ is H or $CH_3$,
$X^1$ is —S—, —NR$^4$—, where $R^4$ is H or $C_1$-$C_4$ alkyl, $R^1$ is a multivalent alkylene or arylene,
$R^2$ is a multivalent saturated or unsaturated alkylene or arylene,
$R^3$ is an alkyl group or aryl group, x is 1 to 3, preferably 3, q is 1 or 2;

$X^2$ is a leaving group such as a halide, and preferably a bromide.

The adhesives of this disclosure optional further comprise non-functional poly(isobutylene) polymers. The unfunctionalized isobutylene (co)polymeric synthetic rubbers are generally resins having a polyisobutylene main or a side chain. In some embodiments, the isobutylene (co)polymers are substantially homopolymers of isobutylene, for example, poly (isobutylene) resins available under the tradenames OPPANOL (BASF AG) and GLISSOPAL (BASF AG). In some embodiments, the isobutylene (co)polymeric resins comprise copolymers of isobutylene, for example, synthetic rubbers wherein isobutylene is copolymerized with another monomer. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). Synthetic rubbers also include copolymers of mostly isobutylene with n-butene or butadiene. In some embodiments, a mixture of isobutylene homopolymer and butyl rubber may be used, i.e., a first polyisobutylene comprises a homopolymer of isobutylene and the second polyisobutylene comprises butyl rubber, or a first polyisobutylene comprises butyl rubber and a second polyisobutylene comprises a homopolymer of isobutylene.

The unfunctionalized isobutylene (co)polymeric synthetic rubber (e.g. PIB) material typically has substantially higher molecular weight than the amine-functionalized (e.g. PIB) synthetic rubber material (described further below). In some embodiments, the weight average molecular weight ($M_w$) of the unfunctionalized isobutylene (co)polymeric synthetic rubber (e.g. PIB) is at least 35,000 grams per mole, at least 100,000 grams per mole, at least 250,000 grams per mole, at least 500,000 grams per mole, or even at least 1,000,000 grams per mole. The weight average molecular weight is typically no greater than 4,000,000 g/mole.

The unfunctionalized isobutylene (co)polymeric synthetic rubber can be a homopolymer, copolymer, or a mixture thereof. Copolymers can be random or block copolymers. Block copolymers can include the polyisobutylene sections in the main backbone, in a side chain, or in both the main backbone and a side chain of the polymer. The polyisobutylene material is typically prepared by polymerizing isobutylene alone or by polymerizing isobutylene plus additional ethylenically unsaturated monomers, such as isoprene, in the presence of a Lewis Acid catalyst such as aluminum chloride, boron trichloride (with titanium tetrachloride as a co-catalyst), or boron trifluoride.

Unfunctionalized isobutylene (co)polymeric rubbers are commercially available from several manufacturers. Homopolymers are commercially available, for example, under the trade designation OPPANOL (e.g., OPPANOL B10, B15, B30, B50, B80, B100, B150, and B200) from BASF Corp. (Florham Park, N.J.). These polymers often have a weight average molecular weight ($M_w$) in the range of about 35,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole. These homopolymers typically do not have reactive double bonds. It is appreciated that the unfunctionalized (e.g. PIB) synthetic rubber may have a very small concentration of reactive double bonds or other functional groups that are residual to the polymerization thereof. The concentration of such reactive double bonds or other functional groups is typically less than 5, 4, 3, or 2 mol %. Such olefinic unsaturations are also typically not suitable functional groups for formation of covalent bonds via free-radical polymerization.

The concentration of unfunctionalized isobutylene (co) polymeric synthetic rubber material in the pressure sensitive adhesive composition is typically less than 50 wt. %, preferably greater than 10 wt. %, relative to the total weight of the composition.

Conventional adhesives do not adhere well to certain substrates, such as certain types of automotive paints and low energy surfaces. Efforts have been made to improve the adhesion of adhesives, i.e., develop more aggressive tack, to these types of surfaces; tackifying the base polymer is commonly practiced. Various types of tackifiers include phenol modified terpenes, hydrocarbon resins such as polyvinyl cyclohexane and poly(t-butyl styrene), and rosin esters such as glycerol esters of rosin and pentaerythritol esters of rosin.

Various types of tackifiers include phenol-modified terpenes and rosin esters such as glycerol esters of rosin and pentaerythritol esters of rosin that are available under the trade names Nuroz™, Nutac™ (Newport Industries), Permalyn™, Staybelite™, Foral™ (Eastman). Also available are hydrocarbon resin tackifiers that typically come from C5 and C9 monomers by products of naphtha cracking and are available under the trade names Piccotac™, Eastotac™, Regalrez™, Regalite™ (Eastman), Arkon™ (Arakawa), Norsolene™, Wintack™ (Cray Valley), Nevtack, LX (Neville Chemical Co.), Hikotack™, Hikorez™ (Kolon Chemical), Novares™ (Rutgers N.V.), Quintone™ (Zeon), Escorez™ (Exxonmobile Chemical), Nures™, and H-Rez™ (Newport Industries).

Conventional tackified pressure-sensitive adhesives can also appear cloudy, demonstrating a loss in the characteristic transparency found in many conventional pressure-sensitive adhesive compositions. The cloudiness is an indication of limited or incomplete compatibility of the tackifier and the polymers. The reduced compatibility can lead to a degradation of adhesive properties on aging, as evidenced by a loss of tack or reduced peel adhesion. In some cases, the addition of a tackifier to an adhesive composition can be clear and appear to be compatible. However, after removing the solvent, curing the adhesive, or on aging, the adhesive can become cloudy, indicating some incompatibility between the tackifier and acrylic base polymer.

In many embodiments, the present disclosure provides tackified adhesive compositions that overcome problems noted in the art. The tackifier is preferably selected from a material that is essentially free of any ethylenically or acetylenically unsaturated bonds. The tackifier includes, but is not limited to, hydrogenated rosin resins, hydrogenated and esterified rosin resins, hydrogenated terpene resins, aliphatic petroleum resins, aromatic petroleum resins, alicyclic petroleum resins obtained by hydrogenating aromatic petroleum resins, and the like. Preferably, the tackifier used is selected from hydrogenated $C_9$ petroleum resins such as but not limited to Regalrez™ tackifiers (Eastman) or Arkon™ (Arakawa) tackifiers. Such "hydrophobic tackifiers", may be used in amounts of greater than zero, typically less than 50 wt. %, preferably greater than 1 wt. %, relative to the total weight of the composition.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of from is typically less than 30 wt. %, preferably greater than 1 wt. %, relative to the total weight of the composition.

In many embodiments, the adhesive composition may comprise comprising
 a) greater than 30 wt. %, preferably greater than 50 wt. %, isobutylene copolymer having pendent alkoxysilane groups;
 b) 0 to 50 wt. % of tackifier, preferably 1 to 50 wt. %, and
 c) 0 to 50 wt. % non-functional poly(isobutylene), preferably 10 to 50 wt. %.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

On exposure to water or humidity, the alkoxysilane groups hydrolyze to silanol groups, which crosslink the polymer by forming siloxane linkages with adjacent alkoxysilane groups. As a result of the hydrolysis and crosslinking, the adhesive's cohesive strength properties increase with time. The crosslinking and formation of siloxane groups is illustrated in Scheme V, where $R^6$ represents the polymeric isobutylene radical having at least 20 repeat units. No additional crosslinking agents, such as di- or polyvalent alcohols or amines are necessary to form the ionic crosslinking. It will be understood that siloxane bonds are labile in the presence of moisture, and constantly cleave and reform.

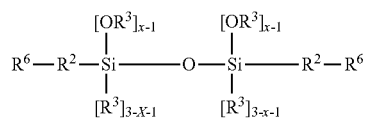

V where
$R^2$ is a multivalent saturated or unsaturated alkylene or arylene
$R^3$ is an alkyl group or aryl group,
x is 1 to 3, preferably 3,
$R^6$ represents the polymeric isobutylene radical having at least 20 repeat units Faster crosslinking is achieved in the presence of a silanol condensation catalyst. Suitable catalysts include organic metal compounds such as tin carboxylates and titanium esters or chelates, e.g., tetrabutyltitanate and bis(acetylacetonyl)diisopropyl titanate; organic bases such as ethylamine, hexylamine and piperidine; and acids such as the mineral acids and fatty acids. The preferred catalysts are the organic tin compounds, for example, dibutyltindilaurate, dibutyltindiacetate and dibutyltindioctoate. Typically, such catalysts are added in amounts between one part to about 3 parts by weight per 100 parts by weight of the moisture-curable polyisobutylene polymer.

In the absence of a silanol condensation catalyst, hydrolysis proceeds slowly at low relative humidity (less than 50% relative humidity), so that it may be desirable to subject the coated tapes to conditions of high relative humidity (at least 50%) and moderately elevated temperature (e.g., 30.degree. to 100.degree. C.), preferably immediately following the coating step. Instead, the coating can be caused to pick up moisture (e.g., by being exposed to steam), and the moisture-bearing tape can be wound up into a jumbo roll, wherein the support can have a release coating on its backside, which is then heated in an oven until the PSA coating has become moisture-cured. Another technique involves blending a PIB polymer with one to ten weight percent, preferably one to two weight percent of a hydrated salt prior to coating and later heating the tape to produce the moisture-curing, either while the tape is in roll form or after it has been put to use. Suitable hydrated salts include $CuSO_4.5H_2O$, $MgSO_4.7H_2O$, $BaSO_4.2H_2O$, $BaCl2.2H_2O$, $CaSO_4.2H_2O$.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

In one embodiment, the adhesive composition may be coated directly on a substrate (from a solution, emulsion or 100% solids) and exposed to a high humidity environment to effect the hydrolysis. In another embodiment adhesive composition may be coated as before, but passively hydrolyzed by exposure to ambient humidity. In either method, the isobutylene polymer may comprise both alkoxysilane groups and the siloxane linkages, as a function of the degree of crosslinking.

In some embodiments, the adhesive compositions, particularly pressure-sensitive adhesive compositions, are applied as a solvent solution or dispersion, the solvent evaporated, and the adhesive composition crosslinked on moisture. Crosslinking of such solvent-based compositions may occur before, but preferably occurs after coating and solvent removal. Suitable solvents such as alkanes, ethyl acetate, toluene and tetrahydrofuran which are unreactive with the functional groups of the components of the copolymer Conventional hot melt adhesives have poor adhesion at temperatures above their melting points and low heat resistance, which limits the use. Since conventional hot melt adhesives cannot maintain sufficient adhesion at high temperatures, they cannot be used in many applications. The instant compositions provide reactive hot melt adhesives that overcome this deficiency. As the instant adhesive compositions crosslink after bonding, they provide improved heat resistance.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference. Those skilled in the art will also know that other additives such as fillers, antioxidants, stabilizers, and colorants may be blended with the adhesive for beneficial properties.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

EXAMPLES

As used in this section, the word polymer may be a homopolymer or a co-polymer, or a mixture thereof.

All tapes were conditioned at 23° C. and 50% relative humidity before testing for 90° Peel Adhesion and Static Shear Strength. The humidity provided sufficient moisture to cure the adhesive on the tapes.

The designation pph indicates parts per one hundred parts of solid polymer by weight, i.e, the weight of all of the polyisobutylene (co-)polymers, but not the weight of liquid polyisobutylene.

Test Methods:

90° Angle Peel Adhesion Strength Test.

Peel adhesion strength was measured at a 90° angle using an IMASS SP-200 slip/peel tester (available from IMASS, Inc., Accord Mass.) at a peel rate of 305 mm/minute (12 inches/minute) using the procedure described in ASTM International standard, D3330, Method F. Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. Two samples were tested for each example and averaged values were expressed in N/dm. Failure mode was noted and recorded as COH—cohesive, i.e., the adhesive split leaving residue on both the tape and test surface, ADH—adhesive, i.e., the adhesive peeled cleanly from the test surface, and 2-B (2-Bond)—the adhesive peeled away from the backing

TABLE 1

Peel Adhesion Test Panel Materials

| Material | Solvent |
| --- | --- |
| HDPE—High density polyethylene | Isopropyl alcohol |
| PP—Polypropylene | Isopropyl alcohol |
| EPDM—Ethylene/propylene/diene monomer copolymer | Isopropyl alcohol |
| Santoprene—thermoplastic Elastomer (TPE) based on EPDM and Polypropylene | Isopropyl alcohol |
| SS—Stainless Steel | Heptane |
| Glass—Soda-lime glass | Heptane |

Static Shear Strength

The static shear strength was evaluated as described in ASTM International standard, D3654, Procedure A at 23° C. and 50% RH (relative humidity) using a 1000 g load. Tape test samples measuring 1.27 cm×15.24 cm (½ in.×6 in.) were adhered to 1.5 inch by 2 inch stainless steel (SS) panels using the method to clean the panel and adhere the tape described in the peel adhesion test. The tape overlapped the panel by 1.27 cm×2.5 cm. and the free end of the strip was folded over itself on the adhesive side, and then folded again. A hook was hung in the second fold and secured by stapling the tape above the hook. The 1000 g weight was attached to the hook and the panel was hung in a room set at 23° C./50% RH. The time to failure in minutes was recorded. If no failure was observed after 10,000 minutes, the test was stopped and a value of >10,000 minutes was recorded. The mode of failure described in the peel adhesion test was also noted.

Gel Content

The gel content by weight percent was determined according to the method described in the ASTM International standard, D3616-95. A round test specimen measuring ⁶³⁄₆₄ inch in diameter was die-cut from a tape coated with the polymer, and catalyst if used, and cured. The specimen and a tarred mesh basket measuring 3.8 cm×3.8 cm were weighed to the nearest 0.1 mg and the original specimen weight was determined (Original Wt). The basket and specimen were placed in a capped jar containing sufficient toluene to cover the sample. After 24 hours the basket and specimen were removed from the toluene, drained and dried in an oven at 120° C. for 30 minutes, and then weighed to determine the weight of unextracted gel on a backing (Residual Wt). The percent gel, by weight, (Wt % Gel) was determined by calculating the weight % of the unextracted portion to the original sample. A disc of the uncoated polyester backing material of the same size as the specimen was die-cut and weighed as the tare weight for the backing (Backing Wt). The formula used for percent gel determination is shown below.

Wt % Gel=[(Residual Wt−Backing wt.)/(Original Wt−Backing wt.)]×100

Materials Used for Examples

The following materials are available from ExxonMobil Corporation (Baytown, Tex.)
    EXXPRO 3745 copolymer—Brominated poly(isobutylene co-methylstyrene)
    ESCOREZ 1310—Hydrocarbon based tackifier The follow materials are available from Sigma Aldrich (St. Louis, Mo.)
    TBAB—Tetrabutylammonium bromide
    CsCO₃—Cesium carbonate
    Silane—3-Mercaptopropyltrimethoxysilane
    Toluene
    Acetone
    Lanxess 2030 copolymer (Bromo Butyl Rubber)—Copolymer of brominated isobutylene-isoprene; Lanxess; Frieberg Switzerland
    OPPANOL B15 polymer—unfunctionalized synthetic rubber (PIB; medium MW—80 kg/mol); BASF; Florham Park N.J.
    GLISSOPAL 1000 polymer—liquid plasticizer (unfunctionalized PIB; low MW—1000 g/mol); BASF; Florham Park N.J.
    DBTDL catalyst—Di-n-butyltin dilaurate; Alfa Aesar; Ward Hill Mass.
    Backing—Hostaphan® 3SAB primed polyester film; Mitsubishi; Greer S.C.

Preparation of Polymers

Polymer 1: 3-Mercaptopropyl Trimethoxysilane Modified Brominated Poly(Isobutylene-Co-Methylstyrene)

A polymer composition was prepared by adding 16.00 g of EXXPRO 3745 copolymer, 1.14 g 3-mercaptopropyl trimethoxysilane, 1.50 g Cs₂CO₃, and 144.00 g of toluene to a three-neck, round-bottomed flask equipped with a Dean-Stark trap, a thermometer, and a nitrogen inlet. The contents of the flask were stirred with a magnetic stir bar under nitrogen at room temperature. Once the copolymer completely dissolved, the flask was heated to 120° C., at which temperature the Cs₂CO₃ reacted with the thiol (—SH) moiety on 3-mercaptopropyl trimethoxysilane to produce nucleophile cesium thiolate (—S⁻Cs⁺) and water. The produced water was azeotropically removed from the system through the Dean-Stark trap. After 5 hours at 120° C. the reaction was cooled to room temperature and the composition was vacuum filtered through a fitted funnel (5 µm pore size) to remove unreacted Cs₂CO₃ and salts. The filtrate was poured into acetone to coagulate the alkoxysilane modified polymer. The isolated polymer was washed with fresh acetone three times to remove residual 3-mercaptopropyl trimethoxysilane. The alkoxysilane modified polymer was filtered and then dried in a vacuum oven for 12 hours at 50° C., and then cooled to room temperature.

Polymer 2: 3-Mercaptopropyl Trimethoxysilane Modified Brominated Poly(Isobutylene-Co-Isoprene)

A polymer composition was prepared by adding 16.00 g of LANXESS 2030 copolymer, 1.14 g of 3-mercaptopropyl trimethoxysilane, 0.64 g of TBAB, and 144.00 g of toluene to a three-neck, round-bottomed flask equipped with a reflux condenser, a thermometer, and a nitrogen inlet. The contents of the flask were stirred with a magnetic stir bar under nitrogen at room temperature. Once all the components completely dissolved, the flask was heated to 105° C. After 5 hours, the reaction was cooled to room temperature and the composition was poured into acetone to coagulate the alkoxysilane modified polymer. The isolated polymer was washed with fresh acetone three times to remove residual silane and TBAB. The alkoxysilane modified polymer was filtered and then dried in a vacuum oven for 12 hours at 50° C., and then cooled to room temperature.

Examples 1-3 and Control Compositions C1-C3

Adhesive compositions for Examples 1-3 were prepared by adding the amounts of Polymer 1 and Oppanol B15 polymer shown in Table 2, 400 parts of toluene, 10 pph (parts per hundred parts of polymer) of ESCOREZ 1310 tackifier, 10 pph of Glissopal 1000 polyisobutylene, and 0.2 pph catalyst (DBTDL) in 100 mL glass jars. The jars were capped and mixed on a roller mill overnight. The resulting compositions were knife-coated onto a 6 inch by 25 inch strip of backing (Hostaphan® 3SAB) to a thickness of about 15 mils wet. The coated film was dried in an oven set at 70° C. for 20 minutes to provide a tape having an adhesive coating thickness of approximately 2 mils. After conditioning, the tapes were tested for Static Shear Strength and 90° Peel Adhesion Strength. Results are shown in Tables 2 and 3.

Adhesive compositions for Examples C1, C2, and C3, were prepared according to the procedure for Examples 1-3, and having the amounts of EXXPRO 3745 (unmodified copolymer) and Oppanol B15 shown in Table 2, 10 pph tackifier, 10 pph plasticizer and 400 parts of toluene. The adhesive compositions were coated into tapes according to the procedure for Examples 1-3. No catalyst was added to these compositions.

Tapes were conditioned and tested for Peel Adhesive and Static Shear Strength. Test results are shown in Tables 2 and 3.

TABLE 2

Adhesive Compositions and Shear Properties

| Ex | Exxpro 3745 (parts) | Polymer 1 (parts) | Oppanol B15 (parts) | Shear Strength (min) | Failure Mode |
|---|---|---|---|---|---|
| 1 | 0 | 100 | 0 | >10,000 | — |
| 2 | 0 | 70 | 30 | >10,000 | — |
| 3 | 0 | 40 | 60 | 1,500 | COH |
| C1 | 100 | 0 | 0 | 3500 | COH |
| C2 | 70 | 0 | 30 | 300 | COH |
| C3 | 40 | 0 | 60 | 50 | COH |

TABLE 3

90° Peel Adhesion of Moisture-Cured PIB-based PSAs

| | 90° Peel Adhesion Strength (N/dm) | | | | | |
|---|---|---|---|---|---|---|
| Example | HDPE | PP | EPDM | Santoprene | SS | Glass |
| 1 | 7 | 35 | 34 | 10 | 23 | 31 |
| 2 | 9 | 31 | 44 | 70 | 32 | 32 |
| 3 | 13 | 39 | 59 | 57 | 35 | 39 |

Examples 4-6 and Control Compositions C4-C6

Adhesive compositions for Examples 4-6 were prepared by adding the amounts of Polymer 2 and Oppanol B15 polymer shown in Table 4, 400 parts of toluene, 10 pph of ESCOREZ 1310 tackifier, 10 pph of Glissopal 1000 polyisobutylene, and 0.2 pph catalyst (DBTDL) in 100 mL glass jars. The jars were capped and mixed on a roller mill overnight. The adhesive compositions were used to prepare tapes having a dry adhesive coating thickness of approximately 2 mils according to the procedure for Examples 1-3.

Adhesive compositions for Examples C4, C5, and C6, were prepared according to the procedure for Examples 4-6 having the amounts of LANXESS 2030 (unmodified copolymer) and Oppanol B15 shown in Table 2, 10 pph of tackifier, 10 pph of plasticizer, and 400 parts of toluene. The adhesives were coated into tapes according to the procedure for Examples 1-3. No catalyst was added to these compositions.

Tapes were conditioned and tested for Peel Adhesive and Static Shear Strength. Test results are shown Tables 4 and 5.

TABLE 4

Coating Formulation and Shear Property

| Ex | LANXESS 2030 (parts) | Polymer 2 (parts) | Oppanol B15 (parts) | Shear Strength (min) | Failure Mode |
|---|---|---|---|---|---|
| 4 | 0 | 100 | 0 | >10,000 | — |
| 5 | 0 | 70 | 30 | 70,000 | — |
| 6 | 0 | 40 | 60 | 1,600 | COH |
| C4 | 100 | 0 | 0 | 840 | COH |
| C5 | 70 | 0 | 30 | 160 | COH |
| C6 | 40 | 0 | 60 | 40 | COH |

TABLE 5

90° Peel Adhesion of Moisture-Cured PIB-based PSAs

| Example Number | 90° Peel Strength (N/dm) | | | | | |
|---|---|---|---|---|---|---|
| | HDPE | PP | EPDM | Santoprene | SS | Glass |
| 4 | 19 | 52 | 45 | 79 | 31 | 25 |
| 5 | 29 | 72 | 75 | 95 | 53 | 36 |
| 6 | 22 | 41 | 70 | 35 | 120 | 52 |

Examples 7-8

Preparation of Tapes for Gel Content Testing

An adhesive composition for Example 7 was prepared for Gel Content Testing by dissolving 100 parts of Polymer 1 in 400 parts of toluene and adding 0.2 pph catalyst (DBTDL) in a capped jar and mixing overnight on a roller mill. The polymer dispersion was coated into a tape and dried according to the procedure for Examples 1-3.

A tape was prepared in the same manner for Example 8 except that Polymer 2 was used in the adhesive composition.

The tapes were conditioned and test for Gel Content. Results are shown in Table 6.

TABLE 6

Percent Gel Test Results

| Example | Polymer | Thickness (mil) | Gel Content - % |
|---|---|---|---|
| 7 | 1 | 2 | 61 |
| 8 | 2 | 2 | 59 |

What is claimed is:

1. An adhesive composition comprising: a) an isobutylene copolymer having pendent alkoxysilane groups, and b) a tackifier.

2. The adhesive composition of claim 1, wherein said isobutylene copolymer is of the formula

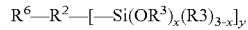

where $R^6$ represents the polymeric isobutylene having at least 20 repeat units, $R^2$ is a multivalent saturated or unsaturated alkylene or arylene, subscript y represents a fraction of those repeat units substituted by the alkoxysilane group, subscript x is 1 to 3, and each $R^3$ is an alkyl group or aryl group.

3. The adhesive composition of claim 2, wherein 1 to 5 percent of the repeat units of the isobutylene copolymer will be substituted by alkoxysilane groups.

4. The adhesive composition of claim 1, comprising greater than 0% by weight but less than 20% by weight of polymerized monomer units having pendent alkoxysilane groups.

5. The adhesive composition of claim 4, wherein the polymerized monomer units having pendent alkoxysilane groups are isoprene monomer units.

6. The adhesive composition of claim 1, wherein the pendent alkoxysilane groups are of the formula —$R^2$—Si—$(OR^3)_x(R^3)_{3-x}$, where $R^2$ is a multivalent saturated or unsaturated alkylene or arylene, each $R^3$ is an alkyl group or aryl group and x is 1 to 3.

7. The adhesive composition of claim 6, wherein the monomer units having pendent alkoxysilane groups is of the formula:

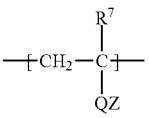

wherein Q is a multivalent linking group, Z is alkoxysilane group and $R^7$ is H or $CH_3$.

8. The adhesive composition of claim 1, comprising 1 to 50 wt. % tackifier, relative to the total weight of the composition.

9. The adhesive composition of claim 1, comprising 10 to 50 wt. % of said tackifier relative to the total weight of the composition.

10. The adhesive composition of claim 1, wherein the copolymer is of the formula;

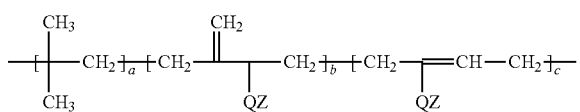

wherein a is at least 20, and at least one of b and c are at least one,

Q is a multivalent linking group, Z is alkoxysilane group and $R^7$ is H or $CH_3$.

11. The adhesive composition of claim 1, wherein the copolymer is of the formula;

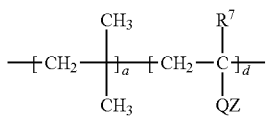

wherein a is at least 20, d is at least one, Q is a multivalent linking group, Z is alkoxysilane group and $R^7$ is H or $CH_3$.

12. The adhesive composition of claim 1, wherein the copolymer has a molecular weight (Mw) of 50,000 to 5,000,000.

13. The adhesive composition of claim 7, wherein the -Q-Z moiety is of the formula

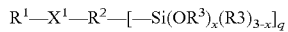

where $R^1$ is a multivalent alkylene or arylene group, $X^1$ is —S—, —$NR^4$—, where $R^4$ is H or $C_1$-$C_4$ alkyl; $R^2$ is a multivalent saturated or unsaturated alkylene or arylene, each $R^3$ is an alkyl group or aryl group, x is 1 to 3, and q is 1 or 2.

14. The adhesive composition of claim 13, wherein $R^1$ is a divalent alkylene or arylene, and $R^2$ is a divalent alkylene.

15. The adhesive composition of claim 4, further comprising a non-functionalized poly(isobutylene) polymer.

16. The adhesive composition of claim 1, comprising
a) greater than 30 wt. % isobutylene copolymer having pendent alkoxysilane groups;
b) 0 to 50 wt. % of tackifier, and
c) 10 to 50 wt. % non-functional poly(isobutylene).

17. The crosslinked adhesive composition of claim 1.

18. The crosslinked composition of claim 17, having siloxane crosslinks.

19. An adhesive article comprising a crosslinked coating of the adhesive of claim 1 on a backing.

20. The adhesive composition of claim 1, wherein said isobutylene copolymer having pendent alkoxysilane groups, is prepared by nucleophilic displacement of a halogenated isobutylene copolymer, with a nucleophilic alkoxysilane compound.

21. The adhesive composition of claim 20, wherein the nucleophilic alkoxysilane of the formula:

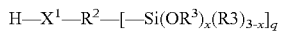

where $X^1$ is —S—, —$NR^4$—, where $R^4$ is H or $C_1$-$C_4$ alkyl; $R^2$ is a multivalent saturated or unsaturated alkylene or arylene, each $R^3$ is an alkyl group or aryl group, x is 1 to 3, and q is 1 or 2.

* * * * *

UNITED STATES PATENT AND TRADEMARK OFFICE
CERTIFICATE OF CORRECTION

PATENT NO. : 8,629,209 B2  
APPLICATION NO. : 13/287148  
DATED : January 14, 2014  
INVENTOR(S) : Lee et al.

Page 1 of 1

It is certified that error appears in the above-identified patent and that said Letters Patent is hereby corrected as shown below:

In the Specification

Column 3,  
Line 26, delete "acrylic," and insert -- acyclic, --.

Column 13,  
Line 64, delete "fitted" and insert -- fritted --.

In the Claims

Column 16,  
Line 23-24, in claim 2,  
delete "$R^6\text{-}R^2\text{-}[\text{-}Si(OR^3)_x(R3)_{3-x}]_y$" and insert -- $R^6\text{—}R^2\text{—}[\text{—}Si(OR^3)_x(R^3)_{3-x}]_y$ --.

Column 17,  
Lines 29-30, in claim 13,  
delete "$R^1\text{—}X^1\text{—}R^2\text{—}[\text{—}Si(OR^3)_x(R3)_{3-x}]_q$" and insert -- $R^1\text{—}X^1\text{—}R^2\text{—}[\text{—}Si(OR^3)_x(R^3)_{3-x}]_q$ --.

Column 18,  
Line 6, in claim 15, delete "claim 4," and insert -- claim 1, --.  
Lines 25-26, in claim 21, delete "$Si(OR^3)_x(R3)_{3-x}]_q$" and insert -- $Si(OR^3)_x(R^3)_{3-x}]_q$ --.

Signed and Sealed this  
Tenth Day of June, 2014

Michelle K. Lee  
*Deputy Director of the United States Patent and Trademark Office*